United States Patent
Prendergast et al.

(10) Patent No.: US 9,531,420 B1
(45) Date of Patent: Dec. 27, 2016

(54) SYSTEMS AND METHODS TO CONTROL TRANSMIT POWER AND SPECIFIC ABSORPTION RATE (SAR) FOR WIRELESS DEVICES

(71) Applicants: Liam Prendergast, Limerick (IE); Gerald R. Pelissier, Mendham, NJ (US); Liam B. Quinn, Austin, TX (US)

(72) Inventors: Liam Prendergast, Limerick (IE); Gerald R. Pelissier, Mendham, NJ (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/734,508

(22) Filed: Jun. 9, 2015

(51) Int. Cl.
*H04B 7/00* (2006.01)
*H04B 1/3827* (2015.01)
*H04W 52/18* (2009.01)
*H04W 52/34* (2009.01)

(52) U.S. Cl.
CPC ........... *H04B 1/3838* (2013.01); *H04W 52/18* (2013.01); *H04W 52/34* (2013.01)

(58) Field of Classification Search
CPC ..................... H04M 2250/12; H04M 2250/22; H04W 4/008
USPC ........................ 455/226.4, 232.1, 522, 263
See application file for complete search history.

(56) References Cited

U.S. PATENT DOCUMENTS

2014/0315592 A1* 10/2014 Schlub ................ H04B 1/3838 455/522

OTHER PUBLICATIONS

Federal Communications Commission Office of engineering & Technology, "Evaluating Compliance With FCC Guidelines for Human Exposure to RadioFrequency Electromagnetic Fields", Supplement C, 2001, 53 pgs.
Federal Communication Commission, "Radio Frequency Safety", Printed From Internet May 27, 2015, 3 pgs.
Toit, "Using Proximity Sensing to Meet Mobile Device FCC SAR Regulations", Apr. 2012, 5 pgs.
Antenna Theory, Specific Absorption Rate (SAR), Printed From Internet May 20, 2015, 3 pgs.
Federal Communications Commission, "Specific Absorption Rate (SAR) for Cell Phones: What It Means for You", Printed From Internet May 20, 2015, 2 pgs.
Federal Communication Commission, "Specific Absorption Rate (SAR) for Cellular Telephones", Printed From Internet May 20, 2015, 2 pgs.

* cited by examiner

*Primary Examiner* — Tu X Nguyen
(74) *Attorney, Agent, or Firm* — Egan Peterman Enders Huston

(57) ABSTRACT

Systems and methods are provided that may be implemented to utilize multiple sensors to intelligently control RF transmit power and specific absorption rate (SAR) produced from a wireless-enabled information handling system platform in the presence of a detected nearby human body. The disclosed systems and methods may be implemented in one example to avoid the poor performance and user experience that results from a reduction in the information handling system platform radio transmit power when it is not necessary (due to false detection of a human body), or that results when the platform transmit power is reduced too much and/or too quickly when nearby proximity of an actual human body is detected.

26 Claims, 7 Drawing Sheets

SYSTEMS AND METHODS TO CONTROL TRANSMIT POWER AND SPECIFIC ABSORPTION RATE (SAR) FOR WIRELESS DEVICES

FIELD OF THE INVENTION

This invention relates generally to information handling systems and, more particularly, to wireless transmission from information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Specific absorption rate (SAR) refers to the rate at which radio frequency (RF) energy is absorbed by the human body, and is used to measure the power absorbed from mobile wireless devices such as cell phones, tablet computers, and notebook computers. Many government agencies around the world have set maximum allowable SAR value limits for such mobile devices when in use. To conform RF emissions to these SAR limits while at the same time maximizing wireless performance, a mobile device has been provided with a single capacitive proximity sensor that detects close proximity of an object such as a human body. A processor within the mobile device has then been used to reduce wireless RF transmission power from the mobile device when the capacitive proximity sensor detects close proximity of a nearby object, but to allow higher RF transmission power in the absence of the detection of a nearby object.

Current methods and implementations for controlling SAR utilize a single capacitive proximity sensor to control only the power transmitted from the main WWAN/LTE transmit antenna of a wireless device, and employ a binary detection mechanism to control wireless RF transmission power based only on either detection or non-detection of a nearby object. Since the capacitive proximity sensor cannot reliably distinguish between a human body and a non-human object proximity trigger event, wireless transmission performance from the device can needlessly suffer when transmit power is reduced due to the detected nearby presence of a non-human object.

SUMMARY

Disclosed herein are systems and methods that may be implemented to utilize multiple sensors to intelligently control SAR produced from a wireless-enabled information handling system platform (e.g., mobile wireless device such as tablet or notebook computer, smart phone, etc.) in the presence of a detected nearby human body, while also enabling optimal wireless RF transmit performance from the platform when no nearby human body is detected. The disclosed systems and methods may be so implemented to be more robust than conventional SAR solutions employed for mobile devices. For example, the disclosed systems and methods may be implemented in one embodiment to avoid the poor performance and user experience that results from a reduction in the information handling system platform radio transmit power when it is not necessary (due to false detection of a human body), or that results when the platform transmit power is reduced too much and/or too quickly when nearby proximity of an actual human body is detected. Thus, the disclosed systems and methods may employ smart usage of combinations of sensors to increase proximity detection field of view and to reduce or substantially eliminate false proximity detection positives and in one embodiment meet FCC or other governmental agency SAR requirements for RF exposure without significant platform performance degradation of wireless feature/s.

The disclosed systems and methods may be implemented in one exemplary embodiment to reliably detect the difference between nearby proximity of an actual human body and a non-human proximity trigger event, and without the need for multiple peripherally-located capacitive SAR sensors located to distinguish between human body and non-human proximity, e.g., such as 4 to 6 capacitive proximity sensors located around the periphery of a wireless tablet device (depending on the size of the tablet device) or other such smart form-factor, which may drive increased complexity, increased cost and require more space for additional capacitive electrodes with associated industrial design and mechanical engineering impacts. Moreover, the disclosed systems and methods may be implemented in a scalable manner for reliable human proximity detection as opposed to capacitive proximity sensing technology which may require increased distance between the multiple capacitive sensing electrodes and sensor integrated circuits needed, leading to increased susceptibility to noise and reduction in proximity detection performance.

In one embodiment, the disclosed systems and methods may be implemented to control SAR resulting from multiple transmit antennas of a single wireless-enabled information handling system platform, including relatively small sized wireless platforms having multiple transmit antennas. This capability is advantageous given the current trend of increased number of transmit antennas supported by a single wireless platform device coupled together with the current trend of decreasing the typical physical wireless device size, e.g., such that SAR conformance is also required for Wi-Fi emissions. Examples of system platform types and environments with which the disclosed systems and methods may be advantageously implemented to meet FCC or other governmental agency SAR requirements for RF signal exposure without significant degradation of the wireless performance include, but are not limited to handheld end user computing (EuC) systems such as tablet-first designs.

In one exemplary embodiment, the disclosed systems and methods may be implemented using multiple different types of sensors provided on board an information handling system. In a further embodiment, these different types of sensors may include all the existing sensors that are provided in a commercial-off-the-shelf (COTS) information handling system platform to more intelligently control SAR emissions from the platform. In any case, smart usage of various combinations of multiple sensors may be implemented to increase proximity detection field of view around an information handling system platform, and may be further implemented to reduce or substantially eliminate occurrence of false positive identification of a nearby human user that requires SAR RF transmit power reduction.

In one embodiment, a fusion of multiple sensors of a wireless-enabled information handling system platform may be used to provide a more detailed system and environment view of the device platform to enable intelligent and dynamic SAR control configurations. For example, one exemplary embodiment of the disclosed systems and methods may utilize knowledge of a wireless device usage profile (e.g., stored in system memory) for a given wireless information handling system to predict likelihood of SAR trigger events for that given information handling system.

In another embodiment, the scope of SAR control may be extended, e.g., by using one or more additional sensor/s or other type devices that are located on some other (proximity adjacent) objects rather than on the information handling system platform itself to determine proximity of a human user to a mobile device antennae of concern. Such off-platform devices may communicate with processing devices of the information handling system, for example, via wired or wireless communication (e.g., Bluetooth RF signal communication, optical communication such as infrared signals, near field communication signals, etc.). Examples of such other objects include, but are not limited to, the body of the current use of the information handling system (e.g., such as using a capacitive, other type proximity sensor or short range RF transmitter located on a user-wearable component that communicates proximity-indicative signals to the system platform that may contain sensed proximity distance values or that may have a received signal strength that varies with proximity to the system platform), or a nearby notebook computer (e.g., the nearby proximity of a human user's body to a cellular phone system platform may be positively detected and reported to processing device/s of the system platform when the user generates input signals by typing on the keyboard of a notebook computer that is wirelessly tethered via Bluetooth to the cellular phone wireless device that is in turn transmitting via Wireless Wide Area Network "WWAN" RF cellular signals).

Specific examples of different types of hardware and/or methodology that may be employed in the practice of the disclosed systems and methods for human proximity detection to detect nearby proximity of a human body to a wireless-enabled information handing system platform include, but are not limited to: 1) thermal sensors such as thermocouples or resistance temperature detectors (RTDs) or thermistors for thermal sensing (e.g., mapping variations in sensed temperature due to contact of a user's human tissue with the platform at different temperature); 2) motion detector to detect motion (e.g., if a mobile information handling system platform has been motionless for a certain period of time then it may be assumed that the platform is not currently being held by a human being); 3) display touch sensor (e.g., detecting a user holding a touch screen display device by using edge touch detection to determine the location of a user's hands and/or fingers when the user is holding the mobile device, and if no touch activity has been reported from the touch screen for a specified period of time and there is IP traffic then it may be assumed that the touch screen display device is not being held by a human—examples of such use cases include Personal Hotspot, Music listening, Video watching, etc.); 4) biometrics sensor (e.g., such as a sensor capable of detecting a nearby user's heart beat and that is placed in proximity to the wireless device platform transmit antennas of concern—such sensors are conventionally employed in wearables and may provide a relatively high level of certainty that an object detected is indeed human tissue); 5) Local localization techniques (e.g., local localization techniques may be established between a wireless-enabled information handling system platform such as a tablet or notebook computer and a second device that is physically associated with a user (such as a user-wearable like a Watch) to determine the real time distance between the user and the wireless platform—in this case some wireless device platforms have restricted access and usage to a certain very limited number of users (such as one, two or more identified users). It will be understood that in a further embodiment, any of such human proximity detection schemes such as described above may be enhanced by a Machine Learning engine, e.g., such as running on the wireless information handling system platform based on user usage history.

In one respect, disclosed herein is an information handling system platform, including: multiple sensors that are each configured to react to a proximity of a human user to the system platform by producing a sensor output signal that is indicative of a proximity distance of the human user to the system platform; one or more antenna elements; at least one transmitter coupled to the one or more antenna elements and configured to transmit radio frequency (RF) signals from each of the antenna elements; and at least one processing device coupled to the transmitter, the processing device being coupled to receive the sensor output signals of the multiple sensors and to determine a real time object proximity detection distance from each of the multiple sensor output signals. The at least one processing device of the system platform may be further configured to control the transmitter to reduce RF transmit power according to at least one proximity distance sensing profile that defines a relationship between RF transmit power reduction and the determined object proximity detection distance according to the multiple sensor outputs.

In another respect, disclosed herein is a method of operating an information handling system platform, including: using multiple sensors of the information handling system platform to detect a proximity of a human user to the system platform by producing a sensor output signal that is indicative of a proximity distance of the human user to the system platform; using at least one processing device of the information handling system platform to receive the sensor output signals of the multiple sensors and to determine a real time object proximity detection distance from each of the multiple sensor output signals; and using the at least one processing device of the information handling system platform to control a transmitter of the information handling system platform to reduce RF transmit power from one or more antennas of the information handling system platform according to at least one proximity distance sensing profile that defines a relationship between RF transmit power reduction and the determined object proximity detection distance according to the multiple sensor outputs.

DESCRIPTION OF ILLUSTRATIVE EMBODIMENTS

Figure 1A:
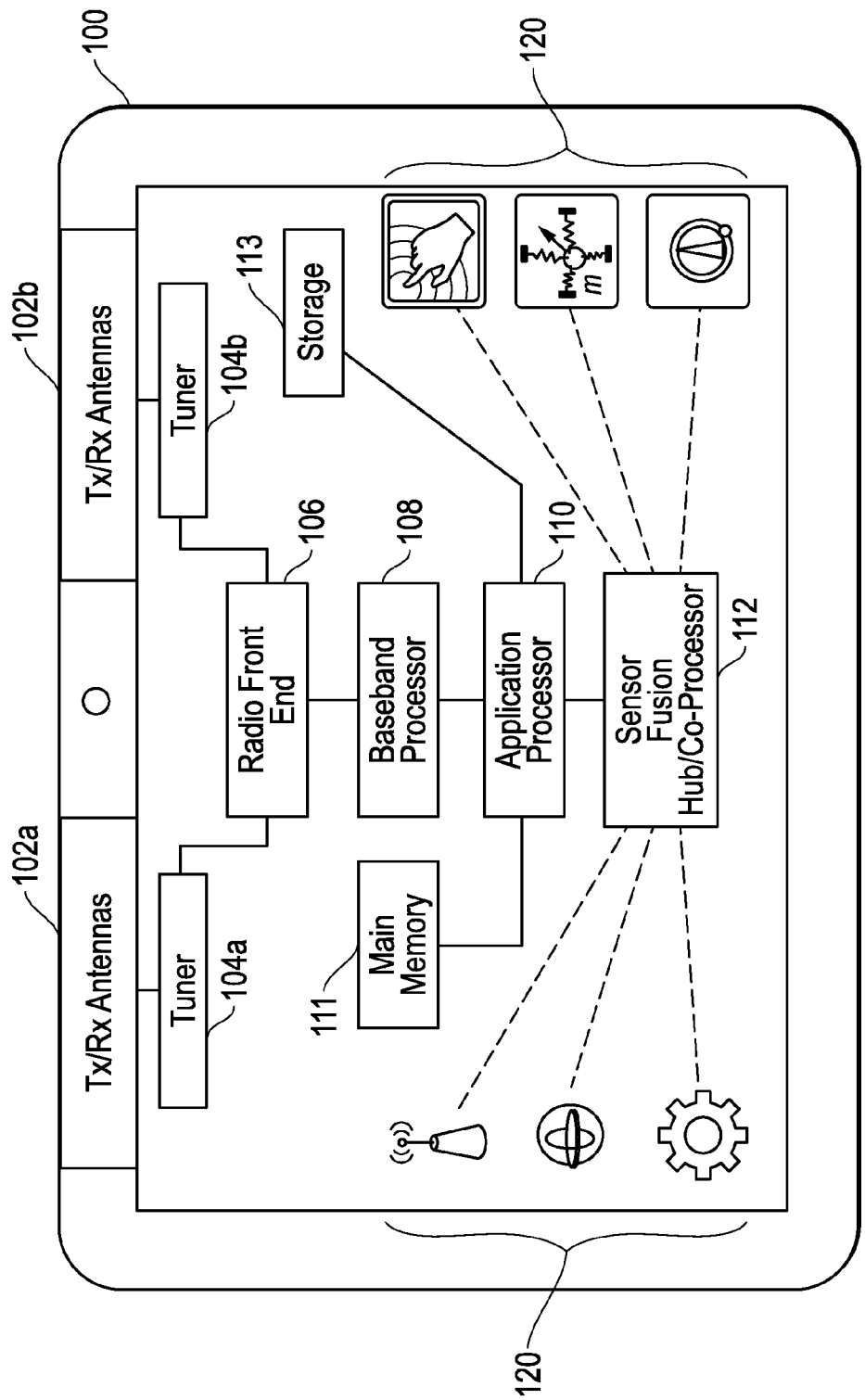
FIG. 1A illustrates a block diagram of a wireless-enabled information handling system platform according to one exemplary embodiment of the disclosed systems and methods.

FIG. 1A illustrates a block diagram of a wireless-enabled information handling system platform 100 that in this exemplary embodiment is configured as a tablet computer. Although a tablet computer is illustrated, it will be understood that the disclosed systems and methods may be implemented with any other type of wireless-enabled information handling system having integral or on-board RF antenna/s including, for example, portable or mobile information handling systems such as notebook computers, laptop computers, smart phones, PDA's, etc.

Still referring to FIG. 1A, information handling system platform 100 includes integrated RF antennas 102a and 102b, which are each coupled to a transmitter that includes respective RF tuner 104a or 104b and radio front end 106 as shown. In the illustrated embodiment, separate tuners 104a and 104b are configured to modify the operating characteristics of the separate antenna elements 102a and 102b, respectively, based on the operating state of the baseband processor 108 and radio front end 106, e.g., based on the current frequency band or RF channel in use. Circuitry of RF tuners 104 and radio front end 106 is configured to perform intermediate frequency (IF) to RF up conversion mixing and RF processing tasks for outgoing transmitted signals to antennas 102, and vice-versa (including down conversion) for incoming received signals from antennas 102. Besides IF, front end 106 may perform up conversion and down conversion between RF and other suitable frequencies for processing by baseband processing device or processor 108, e.g., such as zero-IF frequency, baseband frequency, etc. In this regard, baseband processor 108 (e.g., digital signal processor "DSP" or other suitable RF module or processing device/s) is coupled to exchange outgoing and incoming IF or other suitable signals with baseband processor 108 through respective digital-to-analog (DAC) and analog-to-digital (ADC) converters (not shown). Baseband processor 108 may be configured to manage RF signal transmission and reception, as well as to perform tasks including signal processing, encoding, frequency shifting and/or modulation operations to provide transmitted information in outgoing signals based on digital data provided by application processor 110, and to perform signal processing, decoding, frequency shifting and/or demodulation operations to obtain the message content in the incoming signals as digital data to provide to application processor 110.

Application processor 110 may in one embodiment be a host processing device (e.g., such Intel or AMD-based central processing unit "CPU") or other suitable type of processing device configured to execute a host operating system (OS) and to exchange outgoing and incoming and outgoing digital data with baseband processor 108. Application processor 110 may be coupled as shown to main system memory 111 (e.g., dynamic random access memory "DRAM" or other suitable type of system memory), and to system storage 113 (e.g., media drive/s such as magnetic hard drive/s or optical storage drive/s, solid state drive/s "SSD", other non-volatile memory device/s, etc.). Such storage and memory devices may also be accessible to other processing devices of system platform 100. Application processor 110 may also be configured to execute an operating system (OS) such as Microsoft Windows-based, Linux-based, Apple OS-based or other suitable operating system, as well as to execute applications and system BIOS for system platform 100. Among other things application processor 110 may be coupled (e.g., via a platform controller hub "PCH") to one or more I/O devices or circuitry of system 100 including, but not limited to, video display circuitry, touch-sensitive circuitry or touch pad or keyboard for accepting user input, audio amplifier circuitry and system speaker/s, system microphone, etc.

Further shown in FIG. 1A is sensor fusion hub with co-processor 112 that is coupled to receive sensor inputs from multiple sensors 120, detect nearby proximity of a human user from the multiple sensor inputs, and to determine transmit power reduction based on the multiple sensor inputs in a manner described further herein. It will be understood that in one embodiment, a co-processor 112 may be an integrated component provided within a fusion hub as illustrated. In an alternative architecture embodiment, a co-processor may be a dedicated processing device component that is used instead of a fusion hub processing component.

In one exemplary embodiment, co-processor 112 may be a system-on-a-chip (SoC) that includes an Advanced RISC Machines (ARM)-based processor, although any other suitable type of co-processor or other type of processing device/s may be alternatively employed. It is also possible that the operational tasks of co-processor 112 may also be performed by an application processor 110 or other type of single processor, or may be divided or partitioned between multiple different processing devices of a system 100. It will be understood that multiple sensors 120 coupled to co-processor 112 may be any combination of different sensor types that are configured or otherwise capable of detecting or otherwise reacting to the nearby proximity of a human user to system platform 100 by producing a sensor output signal that is indicative of the nearby proximity of the human user.

Figure 1B:
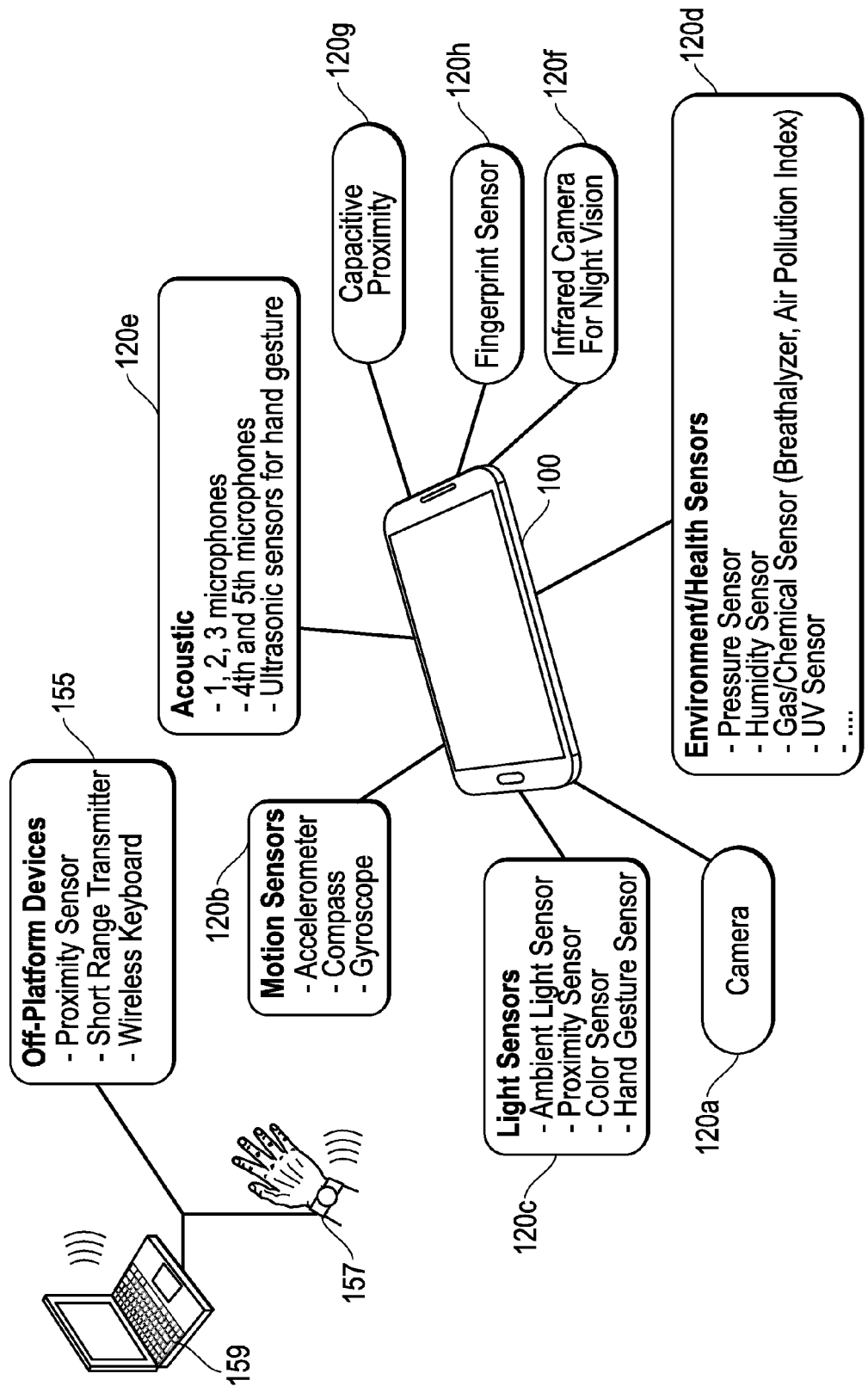
FIG. 1B illustrates examples of multiple sensors for an information handing system platform according to one exemplary embodiment of the disclosed systems and methods.
Figure 2:
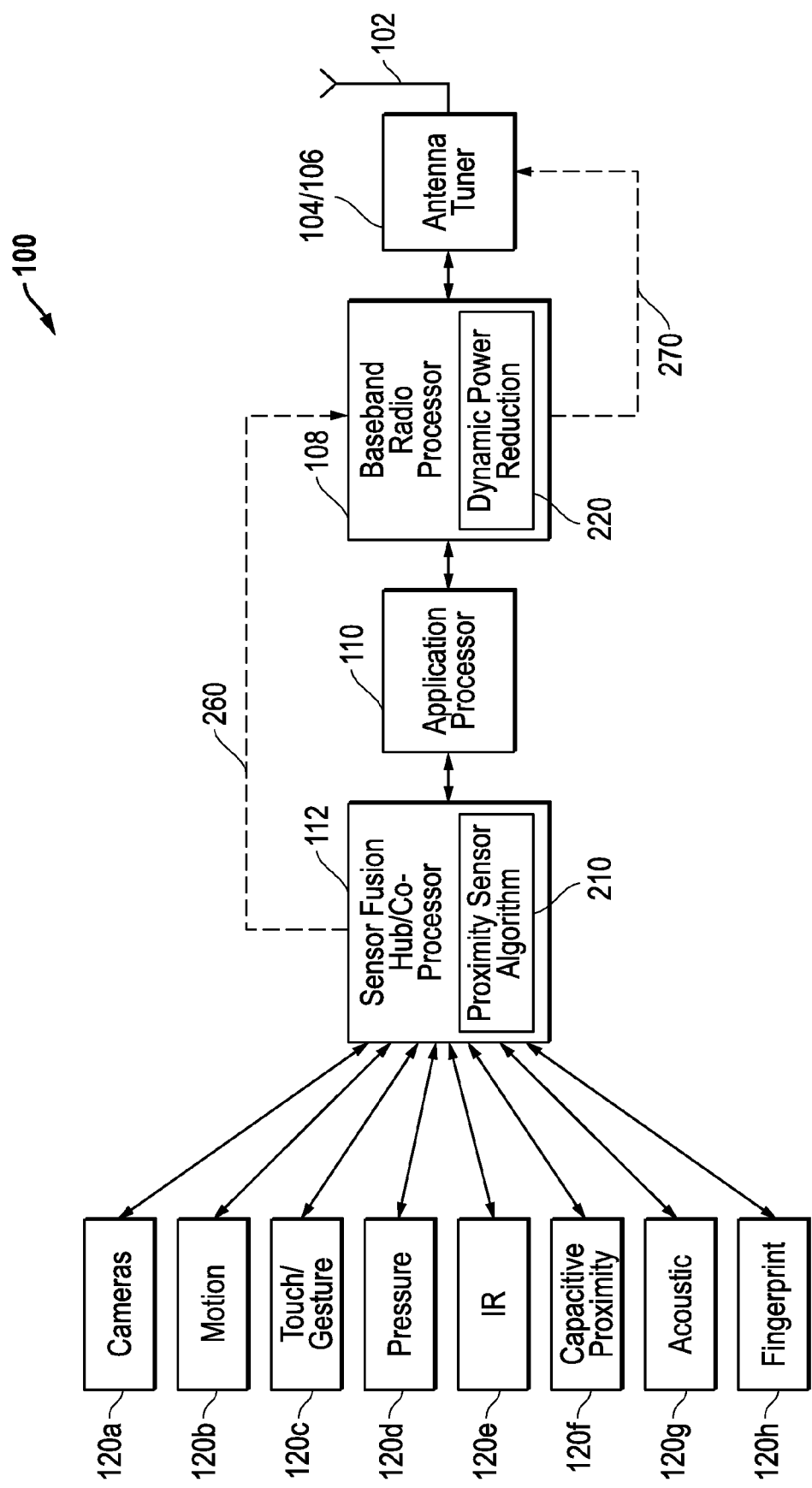
FIG. 2 illustrates a block diagram of SAR control components of an information handling system platform according one exemplary embodiment of the disclosed systems and methods.

FIG. 1B illustrates multiple on-platform sensors 120 that may be coupled to provide sensor output signals to co-processor 112 of information handling system platform 100, with specific examples of particular types of sensors 120 being listed in FIG. 1B. Each of sensors 120 may be co-located or integral to system platform 100 and coupled internally to its other components, or may be positioned external to system platform 100 and coupled to components of system by suitable external I/O ports. FIG. 2 illustrates a block diagram of an exemplary embodiment of the SAR control components of system platform 100, showing a more detailed interrelation of example types of multiple sensors 120 with co-processor 112 that each have different proximity detection distance threshold characteristics. As shown in FIG. 2, suitable sensors 120 may include, but are not limited to, camera/s 120a, motion sensor/s 120b, light sensor/s 120c, environment/health sensor/s 120d, acoustic sensor/s 120e, infrared (IR) sensor/s 120f (such as IR camera/s), capacitive proximity sensor/s 120g, and fingerprint sensor/s 120h. It will be understood that this list of possible sensor types is not exhaustive, and that other additional or alternative sensor types may be operatively employed in a system platform 100. Moreover, not all of the types of sensors 120 illustrated in FIG. 1B need be present, and/or two or more a given type of sensor 120 may be operatively employed in a given system platform 100.

FIG. 1B also illustrates optional off-platform devices 155 that may be located on some other (proximity adjacent) objects rather than on the information handling system platform 100 itself, but nonetheless used by information handling system 100 to determine proximity of a human user to a mobile device antennae 120 of concern. Such off-platform devices 155 may communicate with processing devices of the information handling system platform 100, for example, via wired or wireless communication (e.g., Bluetooth RF signal communication, optical communication such as infrared signals, near field communication signals, etc.). Examples include, but are not limited to, a capacitive, other type proximity sensor or short range RF transmitter located on a user-wearable component 157 that communicates proximity-indicative wireless signals to the system platform that may contain sensed proximity distance information itself or that may be received by information handling system 100 with a received signal strength that varies according to the proximity to the system platform 100); or a nearby notebook computer 159 having a keyboard that may be used to detect the nearby proximity of a human user's body to information handling system platform 100 when it is tethered nearby to notebook computer 159 by wirelessly reporting user typing activity on the keyboard of a notebook computer to processing device/s of the system platform 100 when the user generates input signals by typing on the keyboard of a notebook computer 159.

As shown in FIG. 2, co-processor 112 (e.g. integrated within a sensor fusion hub such as illustrated in FIG. 2) may be configured to contain a proximity-sensing engine that acts as the proximity-sensing brain of the fusion hub. In this embodiment, the proximity-sensing engine may be the core logic that is configured to perform operations to process a proximity sensing algorithm 210. In this regard the proximity-sensing engine may be configured to execute the proximity sensor algorithm 210 (e.g., as a proximity sensing library and application programming interface "API"), issue commands and receive interrupts from the array of sensors 120 that are used for measuring proximity of nearby human users, and to produce a SAR power control command 260 that is provided through application processor 110 to baseband processor 108 as shown. Baseband processor 108 is in turn configured to execute dynamic power reduction control logic 220 that is configured to receive the SAR power control command 260 and based thereon to produce a SAR power level control signal 270 that is provided to circuitry of RF tuners 104 and radio front end 106 to control the RF transmission power level for RF signals transmitted from antenna 102 at any given time.

Figure 3:
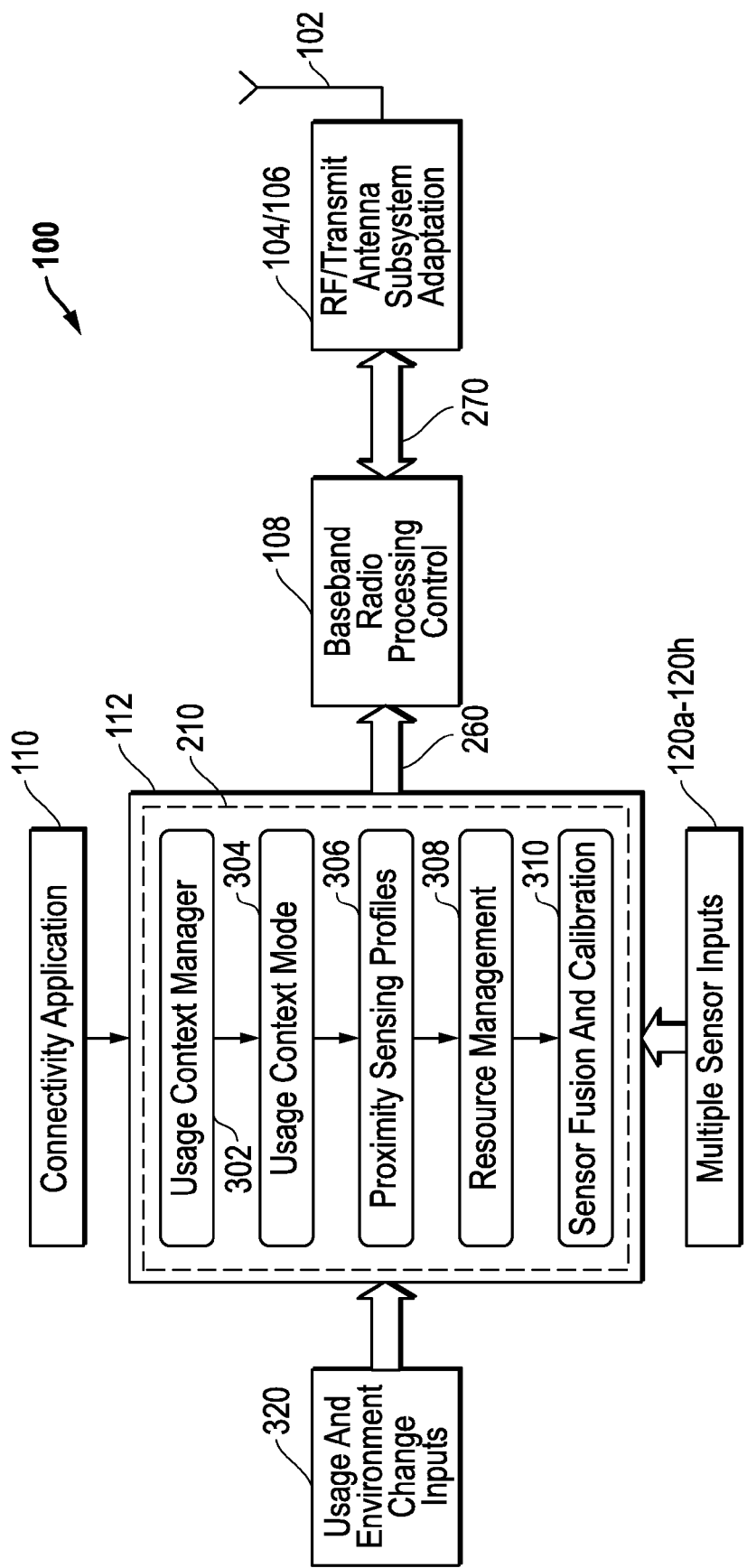
FIG. 3 illustrates a block diagram showing operational aspects of SAR control logic components of an information handling system platform according one exemplary embodiment of the disclosed systems and methods.

FIG. 3 illustrates a block diagram showing operational aspects of the various SAR control logic components of system platform 100. As shown in FIG. 3, application processor 110 is configured to execute a connectivity application which operates to cause uploading or downloading of data via RF signals received and transmitted by antenna 102 to a wireless network through baseband processor 108 and RF tuner and radio front end components of transmitter 104/106 in a manner as previously described. Connectivity application 110 may be any application (e.g., software, firmware, etc.) that executes to upload or download data to wireless network, for example, an Internet browser application, email application, software update application, etc. As further shown in FIG. 3, proximity sensor algorithm 210 is configured to execute as programmed logic on co-processor 112, and is coupled to receive signals from connectivity application 110 that makes usage context manager component logic 302 of proximity sensor algorithm 210 aware of the current data transfer status (e.g., data uploading or data downloading operation for a given type of RF band and antenna 102) being performed by connectivity application 110. Usage context manager component 302 in turn sets a transmit or receive usage context mode identifier 304 that indicates whether a RF transmission operation or reception operation is currently taking place on a given RF band on a given antenna/s 102. It will be understood that the transmit or receive usage context mode identifier 304 may be further mapped and modified according to other aspects of the device usage, e.g., such as the device orientation of system platform 100.

As shown in FIG. 3, multiple proximity distance sensing profiles 306 may be retrieved by proximity sensor algorithm 210 from storage in non-volatile memory (e.g., NVRAM) of co-processor 112, or from any other suitable memory device accessible by co-processor 112. In one embodiment each proximity sensing profile 306 may be defined based on a given radio transmit antenna 102 currently being used, with different profiles 306 applying to different respective antennas 102. Each proximity sensing profile 306 may in turn define a relationship between RF transmit power reduction (e.g., as a percentage or fraction of maximum possible power transmission, as an offset from maximum power transmission wattage level, etc.) and determined nearby object proximity detection distance according to sensor outputs received as inputs by sensor fusion and calibration logic 310 of proximity sensor algorithm 210 from multiple system sensors 120, e.g., sensors 120a-120h. In one embodiment, proximity sensor algorithm 210 may in turn dynamically communicate SAR power control commands 260 to baseband processor 108. SAR power control commands 260 may be in the form of smart sensing fused sensor profile parameter values determined (e.g., for a given antenna or antennas 102) from a combination of fused sensor information (from sensor fusion and calibration logic 310) and proximity distance sensing profiles 306.

SAR power control commands 260 transmitted from proximity sensor algorithm 210 cause dynamic power reduction control logic 220 of baseband processor 108 to produce and provide a corresponding SAR power level control signal 270 to RF tuners 104/radio front end 106 so as to implement usage context-based and proximity detection-based power reduction and to secure optimized performance while at the same time meeting SAR RF exposure requirements. RF tuners 104/radio front end 106 are in turn configured to control RF transmission power level to a given antenna antennas 102 according to SAR power level control signal 270 provided for the given antenna/s 102. In this manner, smart usage of various combinations of multiple sensors 120 may be employed to increase proximity detection field of view and elimination of false positives with respect to nearby human user detection.

As further shown in FIG. 3, proximity sensor algorithm 210 may also be optionally configured to receive usage and environment change inputs 320 for system platform 100, e.g., inputs such as provided from primary or secondary device usage modes as may be configured on the system platform device by a user. Examples of different such usage modes include, but are not limited to, tablet usage mode and notebook usage mode (e.g., in tablet usage mode the display orientation of system platform 100 may be either landscape or portrait orientation depending on current running application and/or on current physical orientation of the system platform 100, while in notebook mode the display orientation may be fixed to be only landscape mode orientation), etc. Examples of such usage and environment change inputs 320 include, but are not limited to, information on environment and operational condition and/or mode changes (such as changes between convertible computer portable mode to stand mode and vice-versa, changes between portrait and landscape orientation for tablet computer system platform, etc.) Multiple different proximity sensing profiles 306 may in turn be defined that each correspond to a different one of multiple possible usage and/or environment modes and/or conditions. Proximity sensor algorithm logic 210 may optionally consider one or more usage and environment change input/s 320 together with fused sensor information to determine smart sensing fused sensor profile parameter values from proximity distance sensing profiles 306.

In one exemplary embodiment, how a system platform is configured and used may be a primary input in determining the proximity distance profiles 306. For example, if the system platform is configured as a hybrid/2-in-1/detachable device it may be configured in several ways by a user. In some usage modes (such as notebook open mode or notebook closed mode) then the proximity sensing function may be disabled or put in a sleep state by proximity sensor algorithm 210. However, if the system platform is configured (or reconfigured) in tablet mode by the user, it may be used in a number of orientations such as primary landscape, primary portrait, secondary landscape or secondary portrait. In each of these orientations proximity sensing be enabled by proximity sensor algorithm 210, and may require separate proximity distance profiles 306 depending on the location of the sensors 120 and transmitting antennae 102 in the system Also shown in FIG. 3 is resource management logic 308 that may be executed as part of proximity sensing algorithm 210 by co-processor 112 to select among multiple sensor inputs 120 for purposes of managing and monitoring the resources required for the sensors 120, such as the number and type of interfaces required, interrupt handling and sensor data buffering requirements etc.

As will be further described herein in relation to FIGS. 5-8, individual proximity distance profiles 306 may be associated with each transmit antenna 102 and/or sensor 120 of FIG. 2 based on upper and lower detection thresholds that are configurable by the proximity sensing engine of co-processor 112. As previously mentioned, each of the multiple types of sensors of FIG. 2 may have different coarseness of proximity detection distance threshold. For example, camera sensor/s 120a may have the most coarse proximity detection distance threshold, motion sensor/s 120b (e.g., accelerometer, gyroscope, etc.) may have a relatively finer proximity detection distance threshold than camera/s 120a, touch/gesture (e.g., user hand-gesture) sensor/s 120c may have a relatively finer proximity detection distance threshold than motion sensor/s 120b, barometric pressure sensor/s 120d may have a relatively finer proximity detection distance threshold than touch/gesture sensor/s 120c, acoustic sensor/s 120e may have a relatively finer proximity detection distance threshold than pressure sensor/s 120d, IR sensor/s 120f may have a relatively closer proximity detection distance threshold than acoustic sensor/s 120e, capacitive proximity sensor/s 120g may have a relatively finer proximity detection distance threshold than IR sensor/s 120f, and fingerprint sensor/s 120h may have a relatively finer proximity detection distance threshold than capacitive sensor/s 120g. As previously mentioned, the particular types and number of different sensors 120 of FIG. 2 are exemplary only, and any combination of fewer, additional, and/or alternative different types of sensors 120 may be provided for a given configuration of an information handling system platform 100.

In one exemplary embodiment, individual sensor proximity distance sensing profiles 306 may be calibrated for each of the sensors 120 used for detection, e.g., using sensor fusion and calibration logic 310. The proximity distances in each profile 306 may be updated by the proximity sensing engine of co-processor 112 to compensate for environmental drift. In this regard, some sensors 120 may be subject to environmental drift (bias) that introduces errors and deviation from the original sensor calibrated levels. Such sensor drift of individual sensors 120 may cause changes in the proximity distance sensing profiles 306 and thus require compensation to correct for these errors. Sensor fusion and calibration logic 310 may be configured to implement automatic sensor calibration algorithms to address drift via frequent self-recalibration.

Figure 4:
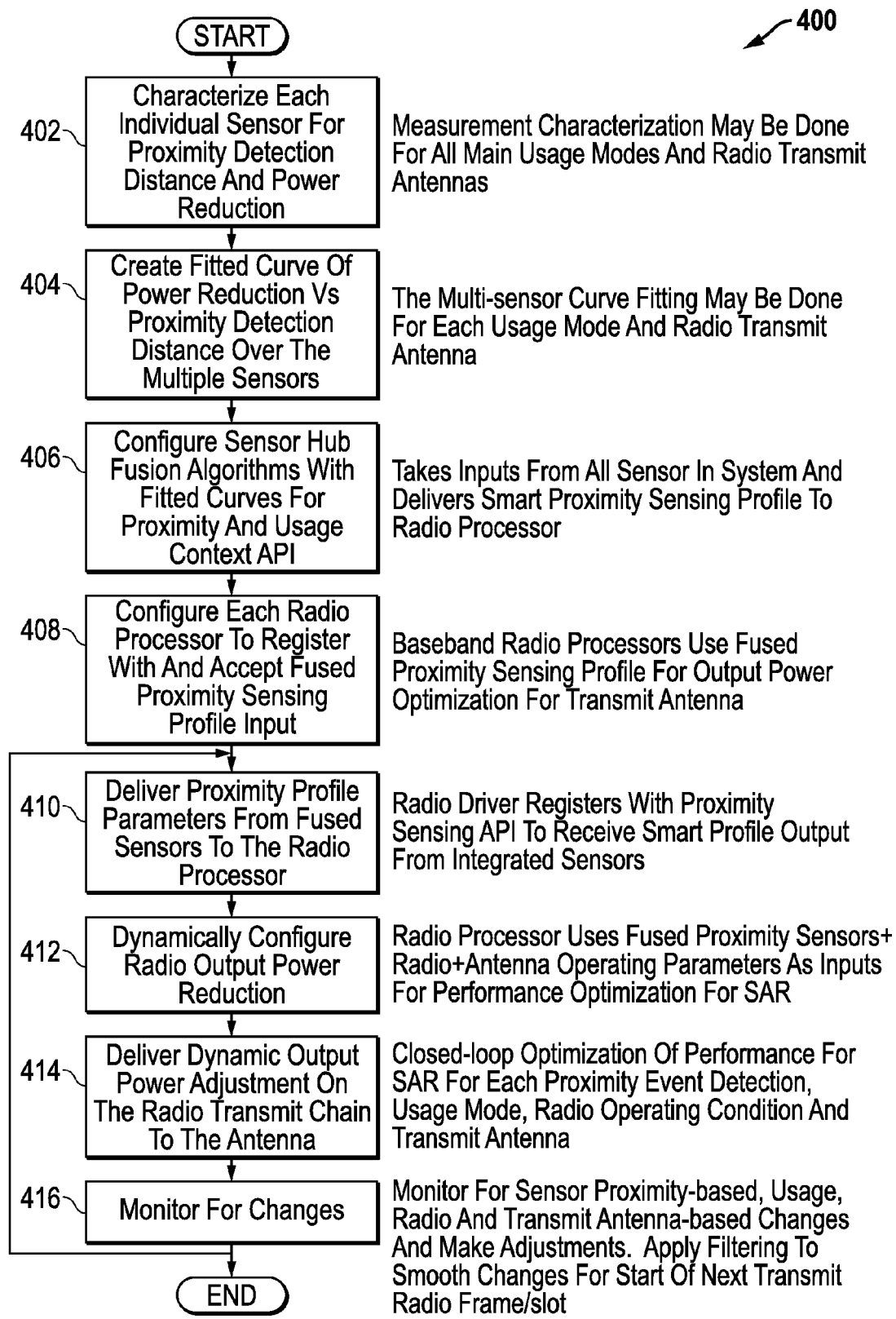
FIG. 4 illustrates methodology according one exemplary embodiment of the disclosed systems and methods.

FIG. 4 illustrates one exemplary embodiment of methodology 400 that may be employed to utilize multiple sensors 120 to intelligently control SAR produced from a wireless-enabled information handling system platform 100. As shown, methodology 400 begins in step 402 where each of multiple sensors 120 of a particular configuration of information handling platform 100 is characterized for human body proximity detection distance (representing the actual distance of the closest part of a human body the information handling system platform) and corresponding RF transmit power reduction. This characterization may be performed in one embodiment using empirical measurements on an actual information handling system platform device 100 during development or manufacture of the information handling system platform 100, e.g., such as in a development lab. Measurement characterization of step 402 may be performed for all main usage modes (e.g., such as tablet primary landscape and portrait modes) and radio transmit antennas 102, e.g., such as antennas 102a and 102b of FIG. 1A. In one embodiment, characterization of step 402 may be performed for information handling system platform device 100 and corresponding antennas 102a and 102b that are configured for transmission of WWAN RF signals (e.g., LTE, WiMAX or wireless metropolitan area network "WMAN", GSM, cellular digital packet data (CDPD), universal mobile telecommunications system (UMTS), CDMA2000, Mobitex, etc. signals), and/or Wi-Fi RF signals (e.g., 2.4 GHz and/or 5 GHz 802.11x standards-based signals, etc.).

Figure 5:
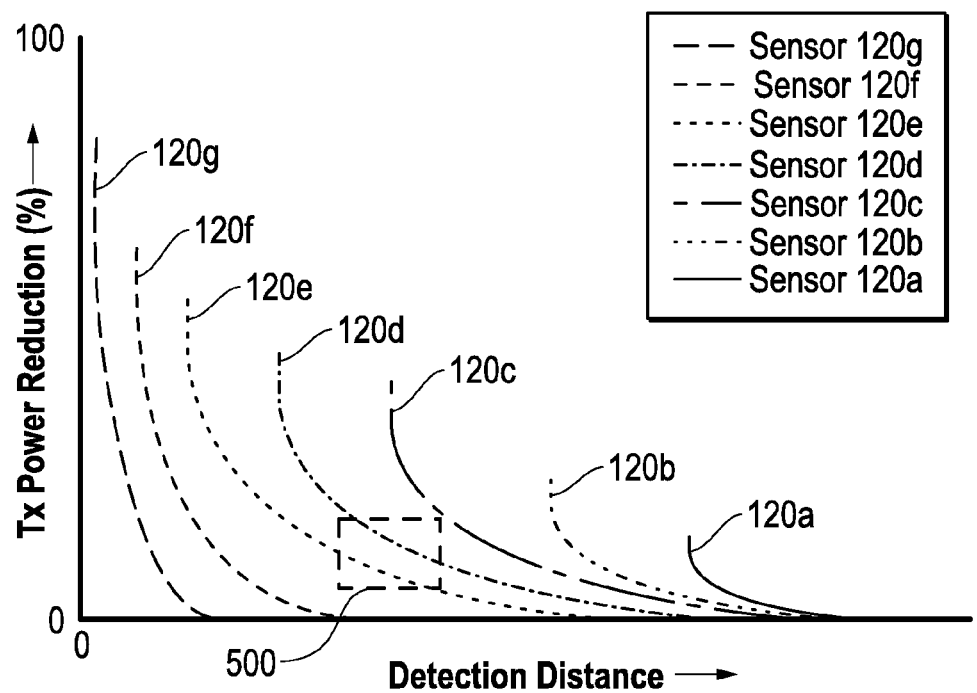
FIG. 5 illustrates RF transmit power reduction for multiple sensors as a function of human body proximity distance to an information handling system platform according to one exemplary embodiment of the disclosed systems and methods.

FIG. 5 illustrates an example of such characterization of each of multiple sensors 120a-120g of the information handling system platform device of FIG. 2 for human body proximity detection distance (i.e., increasing distance in millimeters, centimeters, inches or other suitable measurement unit occurring from left to right on X-axis) and corresponding RF transmit power reduction (i.e., increasing percentage reduction in maximum transmit power occurring in upward direction on Y-axis) for one of antennas 120 operating in a given usage mode to meet SAR requirements, e.g., as specified by FCC 941225 D01 SAR testing procedure for 3G devices, FCC 941225 D05 SAR testing procedure for LTE Devices, FCC 941225 D06 SAR testing procedure for hotspot devices, FCC 941225 D07 UMPC testing procedures for mini tablet devices, etc.

As illustrated in FIG. 5, each of different sensors 120a-120g has a different individual sensor proximity distance sensing profile 306 that in this embodiment includes an individual sensor curve, and that has a different effective range of human body proximity detection distance, detection sensitivity, and corresponding indicated RF transmit power reduction amount for a given value of actual proximity distance of a human body to information handling system platform 100 that is indicated by X-axis value of FIG. 5. In this regard, each of sensors 120 may be configured to produce a sensor output signal that varies with different proximity distance of a human body to the system platform 100 (e.g., such as varying capacitance signal value, varying sound level signal value, varying barometric pressure level signal value level, varying motion level signal value, varying light level signal value, etc.). Further, as shown in FIG. 5 each of sensors 120 may be assigned (e.g., based on empirical SAR compliance measurement for a corresponding transmitter during laboratory testing, or other suitable testing methodology) a varying indicated RF transmit power reduction amount that varies as a function of different proximity distances of a human body to the system platform 100 based on the varying value of its respective sensor output signal as the actual proximity distance of a human body to the system platform 100 (X-axis value) changes.

Figure 6:
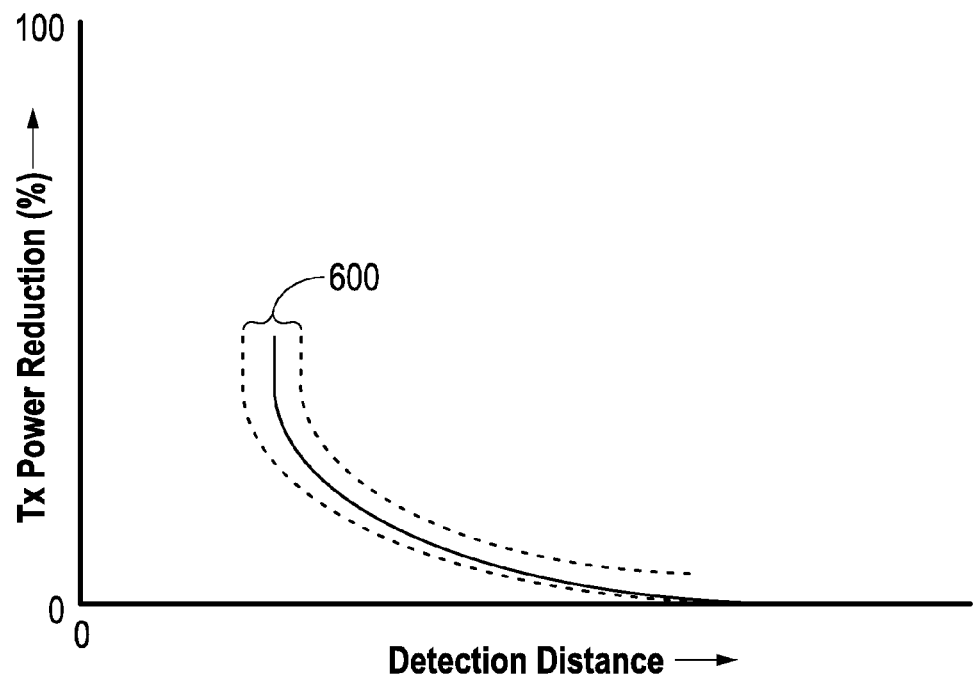
FIG. 6 illustrates a zone of uncertainty of RF transmit power reduction for a given actual proximity detection distance according to one exemplary embodiment of the disclosed systems and methods.

FIG. 5 also illustrates that for the particular range of detection distances corresponding to dashed box 500 of FIG. 5, a different amount of RF transmit power reduction is indicated by the overlap of the individual sensor curves of proximity distance sensing profiles 306 for different sensors 120d and 120e for the same range of actual detected human body proximity distances, i.e., with sensor 120d indicating a larger reduction in RF transmit power than sensor 120e for the same given value of determined actual proximity distance of a human body to information handling system platform 100 that falls within box 500. Thus, more than one RF transmit power reduction value is indicated for a given actual distance determined from multiple overlapping sensors. This creates a zone of uncertainty 600 of required RF transmit power reduction for a given actual proximity detection distance as illustrated in FIG. 6, for which an optimal RF transmit power reduction to meet SAR requirements may be further determined as further described herein. Fingerprint sensor 120h of FIG. 2 is not included in the characterization of FIG. 5 since it positively identifies proximity of a human finger touching information handling system platform 100 at a known distance for which a fixed and known SAR RF transmit power reduction value may be assigned.

Figure 7:
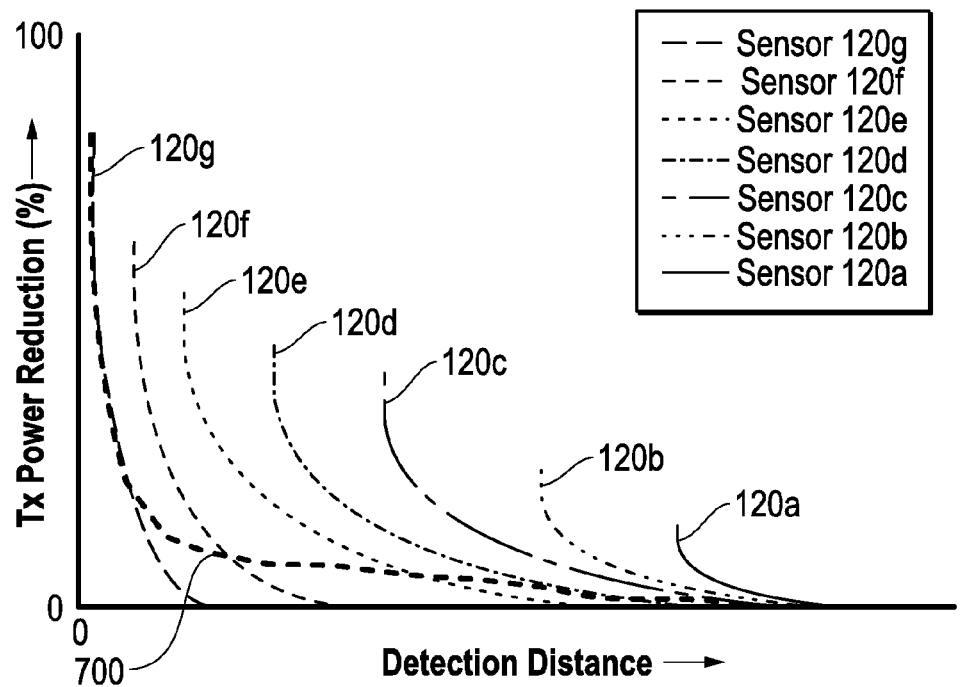
FIG. 7 illustrates a fitted curve of RF transmit power reduction as a function of actual human body proximity detection distance according to one exemplary embodiment of the disclosed systems and methods.

Still referring to FIG. 4, a blended relationship in the form of a fitted curve 700 of RF transmit power reduction as a function of actual human body proximity detection distance over the multiple sensors 120a-120g may be created (e.g., in real time by proximity sensor algorithm 210) in step 404 for each antenna 102 and/or usage mode as illustrated in FIG. 7. In this step, a blended multi-sensor curve fitting approach may be employed to smooth RF transmit power reduction steps over human body (e.g., human hand) proximity detection distances for each antenna 102 and/or usage mode. Fitted curve 700 may be determined using any suitable curve-fitting methodology from the individual RF transmit power reduction value profiles of the corresponding individual sensors 120, e.g., such as a least squares method, total least squares method, interpolation between two consecutive sensor curves of FIG. 7 in the decreasing detection distance direction (i.e., in the right to left direction along X-axis of FIG. 7), interpolation between two consecutives curves of FIG. 7 in the increasing detection distance direction (i.e., in the left to right direction along X-axis of FIG. 7), etc. It will be understood that in other embodiments any other suitable type of blended relationship of different RF transmit power reduction values derived from different sensors as a function of proximity detection distance from the multiple sensors having different effective object distance detection ranges may be employed, e.g., such as a lookup table of blended power reduction values that are each calculated from the average RF transmit power reduction values for two or three sensors having adjacent effective object distance detection ranges.

Figure 8:
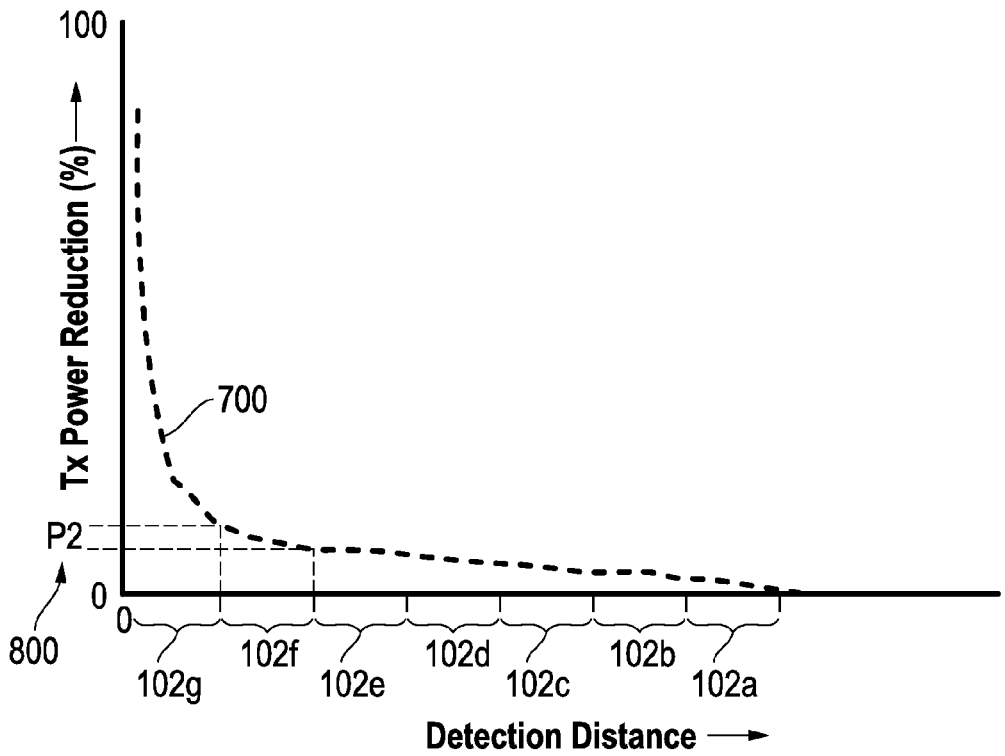
FIG. 8 illustrates ranges of RF transmit power reduction levels assigned to different human body proximity detection distance thresholds defined in a fitted curve for multiple sensors.

FIG. 8 illustrates the resulting ranges of RF transmit power reduction levels assigned to different human body proximity detection distance thresholds defined in the fitted curve 700 for the multiple sensors 120a-120g as illustrated by the bracketed X-axis detection distance ranges of FIG. 8. Each of these different human body proximity detection distance thresholds (together with corresponding X-axis bracketed distance ranges defined between these distance thresholds) of fitted curve 700 corresponds to only a given one of sensors 120, and is to be used one at a time when the corresponding proximity distance detected by the given sensor falls within its corresponding distance range (i.e., so as to "hand off" RF transmit power reduction control between different successive sensors 120 as detection distance changes according to the indicated distance thresholds and corresponding bracketed X-axis detection distance ranges). It will be understood that the number and type of sensors 120 illustrated in FIGS. 7 and 8 are exemplary only, and that it is possible to selectively implement the proximity sensor algorithm 210 to utilize any specified subset of all the available sensors on a system platform, e.g., in real time or by pre-defined default selection.

For example, RF transmit power reduction range 800 (P2) defined by fitted curve 700 is specified for the bracketed X-axis detection distance range assigned only to sensor 102f between sensor brackets 102e and 102g as shown, with similar RF transmit power reduction ranges being individually specified for (and assigned to) each individual sensor 120 as indicated by the different bracketed detection distance ranges of the X-axis proximity detection distance denoted for each sensor 120 in FIG. 8. Thus when the determined detection distance values measured by sensor 102f fall within the assigned bracketed X-axis distance value range 102f of FIG. 8, a corresponding RF transmit power reduction range 800 (P2) is indicated and defined by curve 700. It will also be understood that each different antenna 102 and/or usage mode may be assigned a different shaped curve 700 that corresponds to the required SAR transmit power reduction, and that each transmit antenna 102 and/or usage mode may be assigned such a curve as a proximity distance sensing profile 306 described previously in relation to FIG. 3.

Next, in step 406, proximity sensor algorithm 210 may be configured with the fitted proximity distance sensing profiles 306 for use by the proximity sensing library and API, which is configured to take inputs from all of multiple sensors 120a-120g and to deliver corresponding smart sensing fused profile parameters corresponding to a given transmit antenna 102 to baseband radio processor 108 (or to each baseband radio processor 108 for system platforms 100 having multiple baseband radio processors 108). In step 408, each baseband radio processor 108 is configured to register with and accept the smart sensing fused sensor profile parameters as input from proximity sensor algorithm 210, and to use the smart sensing fused sensor profile parameters to control and optimize output power for the given transmit antenna 102.

Next, in step 410, smart sensing fused sensor profile parameter values 260 for a given antenna 102 and/or usage mode that are based on sensor inputs received from sensors 102a-102g are delivered by proximity sensor algorithm 210 to baseband radio processor 108. In this regard, a radio driver in baseband processor 108 is configured to register with proximity sensing API of proximity sensor algorithm 210 to receive these smart sensing fused sensor profile parameter values 260. In step 412, dynamic power reduction control logic 220 of baseband radio processor 108 is configured to dynamically configure output power reduction (e.g., as a selected fraction of full transmit output power) by using the received smart sensing fused sensor profile parameter values 260 together with radio and antenna operating parameters as inputs for performance optimization for SAR RF power reduction during transmit usage mode determined by usage context manager 302 for a given antenna 102. In this regard, such radio and antenna operating parameters used in step 412 may be, for example, the identity of the frequency band or frequency channel in use by the baseband processor 108 and radio front end 106, and/or the tunable antenna band switching or impedance matching state, etc. In one embodiments such radio and antenna operating parameters may alter to a greater or lesser degree the amount of power reduction that is applied for SAR performance.

In step 414, dynamic power reduction control logic 220 of baseband radio processor 108 delivers the dynamic power adjustment as control signals 270 to the respective radio transmit chain (e.g., radio front end 106 and tuner 104) and given antenna 102. In this way, closed-loop optimization of SAR RF power reduction performance for each proximity event detection distance, usage mode, radio operating condition, and transit antenna 102 may be achieved. In step 416, proximity sensor algorithm 210 monitors for changes in proximity event detection distance, usage mode, radio operating condition, and/or transit antenna 102, and repeats to step 410 as shown.

It will be understood that the illustrated steps of methodology 400 are exemplary only, and that any other combination of additional, fewer and/or alternative steps may be employed that is suitable to implement utilize multiple sensors to intelligently control SAR produced from a wireless-enabled information handling system platform in the presence of a detected nearby human body. It will also be understood that the steps of methodology 400 may be implemented with configurations of RF transmission capable information handling system platform configurations other than that illustrated in relation to FIGS. 1-3. Such alternative configurations include information handling system platforms that include only one transmit antenna 102, that include multiple transmit antennas 102 and multiple baseband processors 108 (with corresponding radio transmit chains), etc.

It will also be understood that one or more of the tasks, functions, or methodologies described herein (e.g., including those described herein for components 108, 110, 112, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system platform, comprising:
multiple sensors that are each configured to react to a proximity of a human user to the system platform by producing a sensor output signal that is indicative of a proximity distance of the human user to the system platform;
one or more antenna elements;
at least one transmitter coupled to the one or more antenna elements and configured to transmit radio frequency (RF) signals from each of the antenna elements; and
at least one processing device coupled to the transmitter, the processing device being coupled to receive the sensor output signals of the multiple sensors and to determine a real time object proximity detection distance from each of the multiple sensor output signals;
where the at least one processing device is further configured to control the transmitter to reduce RF transmit power according to at least one proximity distance sensing profile that defines a relationship between RF transmit power reduction and the determined object proximity detection distance according to the multiple sensor outputs; and
where each of the multiple sensors has a different effective range of human body proximity detection distance; where the proximity distance sensing profile includes a relationship between RF transmit power reduction and multiple separate ranges of determined object proximity detection distance that are each assigned to a corresponding one of the multiple sensors; and where the at least one processing device is further configured to:
 determine for each given sensor of the multiple sensors if the real time object proximity detection distance determined from the sensor output signal of the given sensor is within the range of determined object proximity detection distance that is assigned to that given sensor,
 select the sensor output signal of the given sensor if it is determined that the real time object proximity detection distance determined from the sensor output signal of the given sensor is within the range of determined object proximity detection distance that is assigned to that given sensor, and
 control the transmitter to reduce RF transmit power according to the at least one proximity distance sensing profile as a function of the object proximity detection distance determined based on the sensor output signal of the given sensor and not based on the sensor output signal of any other signal during the time that the real time object proximity detection distance determined from the sensor output signal of the given sensor is within the range of determined object proximity detection distance that is assigned to that given sensor.

2. The system platform of claim 1, further comprising:
a first processing device configured to execute applications and operating system (OS) for the system platform;
a second processing device coupled between the multiple sensors and the first processing device, each of the sensors being configured to react to a proximity of a human user to the system platform by providing a sensor output signal to the second processing device that is indicative of a proximity distance of the human user to the system platform, the second processing device being configured to:
 receive the sensor output signals of the multiple sensors and to determine a real time object proximity detection distance from each of the multiple sensor output signals,
 use the real time object proximity detection distance determined from each of the multiple sensor output signals to determine for each given sensor of the multiple sensors if the real time object proximity detection distance determined from the sensor output signal of the given sensor is within the range of determined object proximity detection distance that is assigned to that given sensor and select the sensor output signal of the given sensor if it is determined that the real time object proximity detection distance determined from the sensor output signal of the given sensor is within the range of determined object proximity detection distance that is assigned to that given sensor,
 use the real time object proximity detection distance determined from the selected sensor output signal to determine a real time RF transmit power reduction value from the at least one proximity distance sensing profile, and
 provide a command to the first processing device that is indicative of the determined real time RF transmit power reduction value to cause the first processing device to output a corresponding RF transmit power control signal that is indicative of the determined real time RF transmit power reduction value; and
at least one baseband processing device coupled between the first processing device and the transmitter, the baseband processing device being configured to control the transmitter in real time to reduce RF transmit power in response to the at least one RF transmit power control signal provided by the first processing device.

3. The system platform of claim 1, where the proximity distance sensing profile includes a blended relationship of different RF transmit power reduction values derived from different sensors as a function of proximity detection distance from the multiple sensors.

4. The system platform of claim 3 where the proximity distance sensing profile comprises a single fitted curve of RF transmit power reduction value versus proximity detection distance, the single fitted curve being determined from different individual RF transmit power reduction value profiles for the corresponding individual sensors at different proximity detection distance.

5. The system platform of claim 1, where the at least one processing device is further configured to communicate with one or more off-platform devices; and to determine proximity of a human user to the system platform based at least in part on communications with the one or more off-platform devices.

6. The system platform of claim 1, where the multiple sensors comprise at least one motion sensor, at least one acoustic sensor, at least one capacitive proximity sensor and at least one fingerprint sensor.

7. The system platform of claim 1, where the at least one transmitter is configured to transmit Wireless Wide Area Network "WWAN" RF cellular signals from each of the antenna elements; and where the at least one processing device is further configured to control the transmitter to reduce WWAN" RF cellular signal transmit power according to the at least one proximity distance sensing profile that defines a relationship between RF transmit power reduction and the determined object proximity detection according to the multiple sensor outputs.

8. The system platform of claim 1, where the information handling system platform is a handheld device configured to be held by a user at the same time that the at least one transmitter is transmitting RF signals from each of the antenna elements.

9. The system platform of claim 1, further comprising multiple different antennas; and where the at least one processing device is further configured to:
control the transmitter to reduce RF transmit power to a first one of the multiple different antennas according to at least a first proximity distance sensing profile that defines a relationship between RF transmit power reduction and the determined object proximity detection distance according to the multiple sensor outputs; and
control the transmitter to reduce RF transmit power to a second and different one of the multiple different antennas according to at least a second and different proximity distance sensing profile that defines a relationship between RF transmit power reduction and the determined object proximity detection distance according to the multiple sensor outputs.

10. The system platform of claim 1, where the platform is reconfigurable between two or more configurations in which at least one of the multiple sensors is positioned in a different location on the platform, the one or more antenna elements are positioned in different locations on the platform, or a combination thereof; where the platform further comprises multiple different antennas; and where the at least one processing device is further configured to:
control the transmitter to reduce RF transmit power according to at least a first proximity distance sensing profile that defines a relationship between RF transmit power reduction and the determined object proximity detection distance according to the multiple sensor outputs when the platform is configured to be in a first one of the two more different platform configurations; and
control the transmitter to reduce RF transmit power according to at least a second and different proximity distance sensing profile that defines a relationship between RF transmit power reduction and the determined object proximity detection distance according to the multiple sensor outputs when the platform is configured to be in a second one of the two more different platform configurations.

11. The system platform of claim 1, where the at least one processing device is further configured to dynamically adjust the output power reduction of the transmitter that has been determined according to the proximity distance sensing profile by further adjusting this determined output power reduction based on an identity of radio frequency or frequency channel of (RF) signals being transmitted from the one or more antenna elements, or a tunable antenna band switching or impedance matching state, or a combination thereof.

12. A method of operating an information handling system platform, comprising:
using multiple sensors of the information handling system platform to detect a proximity of a human user to the system platform by producing a sensor output signal that is indicative of a proximity distance of the human user to the system platform;
using at least one processing device of the information handling system platform to receive the sensor output signals of the multiple sensors and to determine a real time object proximity detection distance from each of the multiple sensor output signals; and
using the at least one processing device of the information handling system platform to control a transmitter of the information handling system platform to reduce RF transmit power from one or more antennas of the information handling system platform according to at least one proximity distance sensing profile that defines a relationship between RF transmit power reduction and the determined object proximity detection distance according to the multiple sensor outputs;
where each of the multiple sensors has a different effective range of human body proximity detection distance; where the proximity distance sensing profile includes a relationship between RF transmit power reduction and multiple separate ranges of determined object proximity detection distance that are each assigned to a corresponding one of the multiple sensors; and where the method further comprises using the at least one processing device to:
determine for each given sensor of the multiple sensors if the real time object proximity detection distance determined from the sensor output signal of the given sensor is within the range of determined object proximity detection distance that is assigned to that given sensor,
select the sensor output signal of the given sensor if it is determined that the real time object proximity detection distance determined from the sensor output signal of the given sensor is within the range of determined object proximity detection distance that is assigned to that given sensor, and
control the transmitter to reduce RF transmit power according to the at least one proximity distance sensing profile as a function of the object proximity detection distance determined based on the sensor output signal of the given sensor and not based on the sensor output signal of any other signal during the time that the real time object proximity detection distance determined from the sensor output signal of the given sensor is within the range of determined object proximity detection distance that is assigned to that given sensor.

13. The method of claim 12, further comprising:
using a first processing device configured to execute applications and operating system (OS) for the system platform;
using each of the sensors to react to a proximity of a human user to the system platform by providing to a second processing device of the information handling system platform a sensor output signal that is indicative of a proximity distance of the human user to the system platform;
using the second processing device to:
receive the sensor output signals of the multiple sensors and to determine a real time object proximity detection distance from each of the multiple sensor output signals,
use the real time object proximity detection distance determined from each of the multiple sensor output signals to determine for each given sensor of the multiple sensors if the real time object proximity detection distance determined from the sensor output signal of the given sensor is within the range of determined object proximity detection distance that is assigned to that given sensor and select the sensor output signal of the given sensor if it is determined that the real time object proximity detection distance determined from the sensor output signal of the given sensor is within the range of determined object proximity detection distance that is assigned to the given sensor, use the real time object proximity detection distance determined from the selected sensor output signal to determine a real time RF transmit power reduction value from at least one proximity distance sensing profile, and provide a command to the first processing device that is indicative of the determined real time RF transmit power reduction value to cause the first processing device to output a corresponding RF transmit power control signal to a baseband processing device that is indicative of the determined real time RF transmit power reduction value; and using the at least one baseband processing device to control the transmitter in real time to reduce RF transmit power in response to the at least one RF transmit power control signal provided by the first processing device.

14. The method of claim 12, where the proximity distance sensing profile includes a blended relationship of different RF transmit power reduction values derived from different sensors as a function of proximity detection distance from the multiple sensors.

15. The method of claim 14 where the proximity distance sensing profile comprises a single fitted curve of RF transmit power reduction value versus proximity detection distance, the single fitted curve being determined from different individual RF transmit power reduction value profiles for the corresponding individual sensors at different proximity detection distance.

16. The method of claim 12, further comprising using the at least one processing device to communicate with one or more off-platform devices; and to determine proximity of a human user to the system platform based at least in part on communications with the one or more off-platform devices.

17. The method of claim 12, where the multiple sensors comprise at least one motion sensor, at least one acoustic sensor, at least one capacitive proximity sensor and at least one fingerprint sensor.

18. The method of claim 12, further comprising:
using the at least one transmitter to transmit Wireless Wide Area Network "WWAN" RF cellular signals from each of the antenna elements; and
using the at least one processing device to control the transmitter to reduce WWAN" RF cellular signal transmit power according to the at least one proximity distance sensing profile that defines a relationship between RF transmit power reduction and the determined object proximity detection according to the multiple sensor outputs.

19. The method of claim 12, further comprising using the transmitter to transmit RF signals from each of the antenna elements at the same time that the information handling system platform is being held by a user.

20. The method of claim 12, where the platform further comprises multiple different antennas; and where the method further comprises using the at least one processing device to:
control the transmitter to reduce RF transmit power to a first one of the multiple different antennas according to at least a first proximity distance sensing profile that defines a relationship between RF transmit power reduction and the determined object proximity detection distance according to the multiple sensor outputs; and
control the transmitter to reduce RF transmit power to a second and different one of the multiple different antennas according to at least a second and different proximity distance sensing profile that defines a relationship between RF transmit power reduction and the determined object proximity detection distance according to the multiple sensor outputs.

21. The method of claim 12, where the platform is reconfigurable between two or more configurations in which at least one of the multiple sensors is positioned in a different location on the platform, the one or more antenna elements are positioned in different locations on the platform, or a combination thereof; where the platform further comprises multiple different antennas; and where the method further comprises using the at least one processing device to:
control the transmitter to reduce RF transmit power according to at least a first proximity distance sensing profile that defines a relationship between RF transmit power reduction and the determined object proximity detection distance according to the multiple sensor outputs when the platform is configured to be in a first one of the two more different platform configurations; and
control the transmitter to reduce RF transmit power according to at least a second and different proximity distance sensing profile that defines a relationship between RF transmit power reduction and the determined object proximity detection distance according to the multiple sensor outputs when the platform is configured to be in a second one of the two more different platform configurations.

22. The method of claim 12, further comprising using the at least one processing device is to dynamically adjust the output power reduction of the transmitter that has been determined according to the proximity distance sensing profile by further adjusting this determined output power reduction based on an identity of radio frequency or frequency channel of (RF) signals being transmitted from the one or more antenna elements, or a tunable antenna band switching or impedance matching state, or a combination thereof.

23. An information handling system platform, comprising:
multiple sensors that are each configured to react to a proximity of a human user to the system platform by producing a sensor output signal that is indicative of a proximity distance of the human user to the system platform;
one or more antenna elements;
at least one transmitter coupled to the one or more antenna elements and configured to transmit radio frequency (RF) signals from each of the antenna elements; and
at least one processing device coupled to the transmitter, the processing device being coupled to receive the sensor output signals of the multiple sensors and to determine a real time object proximity detection distance from each of the multiple sensor output signals;
where the at least one processing device is further configured to control the transmitter to reduce RF transmit power according to at least one proximity distance sensing profile that defines a relationship between RF transmit power reduction and the determined object proximity detection distance according to the multiple sensor outputs; and where the at least one processing device is further configured to receive proximity-indicative signals from one or more proximity sensors located on one or more off-platform devices; and to control the transmitter to reduce RF transmit power based at least in part on the received proximity-indicative signals from the one or more proximity sensors located on one or more off-platform devices.

24. An information handling system platform, comprising:
    multiple sensors that are each configured to react to a proximity of a human user to the system platform by producing a sensor output signal that is indicative of a proximity distance of the human user to the system platform;
    one or more antenna elements;
    at least one transmitter coupled to the one or more antenna elements and configured to transmit radio frequency (RF) signals from each of the antenna elements; and
    at least one processing device coupled to the transmitter, the processing device being coupled to receive the sensor output signals of the multiple sensors and to determine a real time object proximity detection distance from each of the multiple sensor output signals;
    where the at least one processing device is further configured to control the transmitter to reduce RF transmit power according to at least one proximity distance sensing profile that defines a relationship between RF transmit power reduction and the determined object proximity detection distance according to the multiple sensor outputs
    where the proximity distance sensing profile includes a blended relationship of different RF transmit power reduction values derived from different sensors as a function of proximity detection distance from the multiple sensors; and
    where the proximity distance sensing profile comprises a lookup table of blended power reduction values that are each calculated from average RF transmit power reduction values for two or three sensors having adjacent effective object distance detection ranges.

25. A method of operating an information handling system platform, comprising:
    using multiple sensors of the information handling system platform to detect a proximity of a human user to the system platform by producing a sensor output signal that is indicative of a proximity distance of the human user to the system platform;
    using at least one processing device of the information handling system platform to receive the sensor output signals of the multiple sensors and to determine a real time object proximity detection distance from each of the multiple sensor output signals; and
    using the at least one processing device of the information handling system platform to control a transmitter of the information handling system platform to reduce RF transmit power from one or more antennas of the information handling system platform according to at least one proximity distance sensing profile that defines a relationship between RF transmit power reduction and the determined object proximity detection distance according to the multiple sensor outputs; and
    using the at least one processing device to receive proximity-indicative signals from one or more proximity sensors located on one or more off-platform devices; and to control the transmitter to reduce RF transmit power based at least in part on the received proximity-indicative signals from the one or more proximity sensors located on one or more off-platform devices.

26. A method of operating an information handling system platform, comprising:
    using multiple sensors of the information handling system platform to detect a proximity of a human user to the system platform by producing a sensor output signal that is indicative of a proximity distance of the human user to the system platform;
    using at least one processing device of the information handling system platform to receive the sensor output signals of the multiple sensors and to determine a real time object proximity detection distance from each of the multiple sensor output signals; and
    using the at least one processing device of the information handling system platform to control a transmitter of the information handling system platform to reduce RF transmit power from one or more antennas of the information handling system platform according to at least one proximity distance sensing profile that defines a relationship between RF transmit power reduction and the determined object proximity detection distance according to the multiple sensor outputs;
    where the proximity distance sensing profile includes a blended relationship of different RF transmit power reduction values derived from different sensors as a function of proximity detection distance from the multiple sensors; and
    where the proximity distance sensing profile comprises a lookup table of blended power reduction values that are each calculated from average RF transmit power reduction values for two or three sensors having adjacent effective object distance detection ranges.

* * * * *